(12) United States Patent
Shifrin et al.

(10) Patent No.: US 9,262,821 B2
(45) Date of Patent: Feb. 16, 2016

(54) INSPECTION RECIPE SETUP FROM REFERENCE IMAGE VARIATION

(71) Applicant: KLA-Tencor Corporation, Milpitas, CA (US)

(72) Inventors: Eugene Shifrin, Sunnyvale, CA (US); Chetana Bhaskar, San Jose, CA (US); Ashok V. Kulkarni, San Jose, CA (US); Chien-Huei (Adam) Chen, San Jose, CA (US); Kris Bhaskar, San Jose, CA (US); Brian Duffy, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 14/707,573

(22) Filed: May 8, 2015

(65) Prior Publication Data

US 2015/0324964 A1 Nov. 12, 2015

Related U.S. Application Data

(60) Provisional application No. 61/992,170, filed on May 12, 2014.

(51) Int. Cl.
*G06K 9/00* (2006.01)
*G06T 7/00* (2006.01)

(52) U.S. Cl.
CPC .............. *G06T 7/001* (2013.01); *G06T 2200/28* (2013.01); *G06T 2207/30148* (2013.01)

(58) Field of Classification Search
CPC ................... G06T 7/0006; G06T 2207/20076; G06T 7/0008; G06T 2207/30148; G06T 7/001; G06T 2200/28; G03F 1/84
See application file for complete search history.

(56) References Cited

U.S. PATENT DOCUMENTS

| | | | |
|---|---|---|---|
| 6,456,899 B1 | 9/2002 | Gleason et al. | |
| 6,535,222 B1* | 3/2003 | Mochizuki | G06F 17/5068 345/619 |
| 7,330,042 B2 | 2/2008 | Fukazawa et al. | |
| 7,676,077 B2 | 3/2010 | Kulkarni et al. | |
| 7,796,801 B2* | 9/2010 | Kitamura | G06K 9/00 348/125 |
| 7,796,804 B2 | 9/2010 | Bhaskar et al. | |
| 7,877,722 B2 | 1/2011 | Duffy et al. | |
| 8,126,255 B2 | 2/2012 | Bhaskar et al. | |
| 8,204,296 B2 | 6/2012 | Bhaskar et al. | |
| 8,295,580 B2 | 10/2012 | Kuan | |

(Continued)

FOREIGN PATENT DOCUMENTS

WO 2013/109755 7/2013

*Primary Examiner* — Brian Le
(74) *Attorney, Agent, or Firm* — Ann Marie Mewherter

(57) ABSTRACT

Systems and methods for generating information for use in a wafer inspection process are provided. One method includes acquiring output of an inspection system for die(s) located on wafer(s), combining the output for the die(s) based on within die positions of the output, determining, on a within die position basis, a statistical property of variation in values of characteristic(s) of the combined output, and assigning the within die positions to different groups based on the statistical properties determined for the within die positions. The method also includes storing information for the within die positions and the different groups to which the within die positions are assigned in a storage medium that is accessible to the inspection system for performing the wafer inspection process, which includes applying defect detection parameter(s) to additional output of the inspection system generated for a wafer based on the information thereby detecting defects on the wafer.

38 Claims, 2 Drawing Sheets

(56) References Cited

U.S. PATENT DOCUMENTS

| | | |
|---|---|---|
| 8,407,627 B2 | 3/2013 | Pack et al. |
| 8,479,125 B2 | 7/2013 | Pierrat |
| 8,611,639 B2 | 12/2013 | Kulkarni et al. |
| 2004/0057611 A1 | 3/2004 | Kim et al. |
| 2007/0288219 A1* | 12/2007 | Zafar ................. G03F 1/84 703/14 |
| 2008/0130982 A1* | 6/2008 | Kitamura ................. G06K 9/00 382/144 |
| 2009/0041332 A1 | 2/2009 | Bhaskar et al. |
| 2011/0052040 A1 | 3/2011 | Kuan |
| 2013/0077101 A1* | 3/2013 | Sharoni ................. G03F 1/144 356/625 |

* cited by examiner

INSPECTION RECIPE SETUP FROM REFERENCE IMAGE VARIATION

BACKGROUND OF THE INVENTION

1. Field of the Invention

The present invention generally relates to systems and methods for generating information for use in a wafer inspection process based on empirical image information.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

Inspection generally involves generating some output (e.g., images, signals, etc.) for a wafer by directing light or electrons to the wafer and detecting the light or electrons from the wafer. Once the output has been generated, defect detection is typically performed by applying some defect detection method and/or algorithm to the output. Parameters used to generate the output (e.g., optical or electron beam hardware settings) and parameters used to detect the defects (e.g., defect detection algorithm settings) are typically determined based on characteristics of the wafer and defects to be detected thereon. Most often, the goal of inspection recipe setup is to determine the parameters that will provide the highest sensitivity to defects of interest while suppressing detection of nuisance and noise on the wafer. Determining the appropriate inspection parameters becomes much more difficult when the characteristics of the wafer vary across the wafer. Examples of wafers whose characteristics vary across the wafer include, but are not limited to, patterned wafers (on which the patterned features vary as a function of within wafer positions) and wafers having some source of non-defect-related noise that varies across the wafers.

Many different methods and systems have, therefore, been created that can be used to determine and vary inspection parameters across a wafer. For example, information about the patterns being formed on a wafer can be used to determine and apply different inspection parameters across a wafer. The pattern information may be acquired using physical design data and electronic design automation (EDA) design rule check type tools. The pattern information can be searched for different types of patterns that may affect the inspection process using, for example, a rule-based search and/or a pattern search. In addition, pattern information from any source such as process modeling, statistical analysis of test results, or failure analysis may be used to determine and apply inspection parameters that vary across the wafer.

There are, however, a number of disadvantages of the currently used methods for wafer inspection setup. For example, the current approaches assume that pattern noise is well-behaved and uniform across wafers. However, due to systematic process signatures this is often not the case. In addition, the care area sets (where "care areas" are generally defined as the areas in the pattern and/or on the wafer that a user cares about and are therefore inspected) determined from pattern information may be too numerous relative to the capacity of the inspector to treat them each individually. The combination of care area groups may therefore be required. Such care area group combination may typically be performed in an ad hoc fashion today. Another disadvantage is that care area sets may often contain an inhomogeneous set of patterns which in fact have very different noise characteristics.

Accordingly, it would be advantageous to develop systems and methods for generating information for use in a wafer inspection process that do not have one or more of the disadvantages described above.

SUMMARY OF THE INVENTION

The following description of various embodiments is not to be construed in any way as limiting the subject matter of the appended claims.

One embodiment relates to a computer-implemented method for generating information for use in a wafer inspection process. The method includes acquiring output of an inspection system for one or more dies located on one or more wafers. The method also includes combining the output for the one or more dies based on within die positions of the output. In addition, the method includes determining, on a within die position basis, a statistical property of variation in values of one or more characteristics of the combined output. The method further includes assigning the within die positions to different groups based on the statistical properties determined for the within die positions. Furthermore, the method includes storing information for the within die positions and the different groups to which the within die positions are assigned in a storage medium that is accessible to the inspection system for performing the wafer inspection process. The wafer inspection process includes applying one or more defect detection parameters to additional output of the inspection system generated for a wafer based on the information to thereby detect defects on the wafer. The acquiring, combining, determining, assigning, and storing steps are performed by a computer system.

Each of the steps of the method may be further performed as described herein. In addition, the method may include any other step(s) of any other method(s) described herein. Furthermore, the method may be performed by any of the systems described herein.

Another embodiment relates to a non-transitory computer-readable medium storing program instructions executable on a computer system for performing a computer-implemented method for generating information for use in a wafer inspection process. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to generate information for use in a wafer inspection process. The system includes a computer subsystem configured for performing the acquiring, combining, determining, and assigning steps of the method described above. The system also includes a storage medium coupled to the computer subsystem and configured for performing the storing step of the method described above. The storage medium is accessible to the inspection system for performing the wafer inspection process, and the wafer inspection process includes applying one or more defect detection parameters to additional output of the inspection system generated for a wafer based on the information to thereby detect defects on the wafer. The system may be further configured as described herein.

A further embodiment relates to a computer-implemented method for detecting defects on a wafer. The method includes acquiring output of an inspection system for one or more dies located on one or more wafers and combining the output for the one or more dies based on within die positions of the output. The method also includes determining, on a within die position basis, a statistical property of variation in values of one or more characteristics of the combined output and assigning the within die positions to different groups based on the statistical properties determined for the within die positions. In addition, the method includes assigning one or more defect detection parameters to the different groups based on the statistical properties for the within die positions assigned to the different groups and acquiring additional output for a wafer with the inspection system. The method further includes assigning the additional output to the different groups by comparing the within die positions of the additional output with the within die positions assigned to the different groups and detecting defects on the wafer by applying the one or more defect detection parameters to the additional output based on the different groups to which the additional output has been assigned. The steps of this method are performed by a computer system.

Each of the steps of this method may be further performed as described herein. In addition, the method may include any other step(s) of any other method(s) described herein. Furthermore, the method may be performed by any of the systems described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
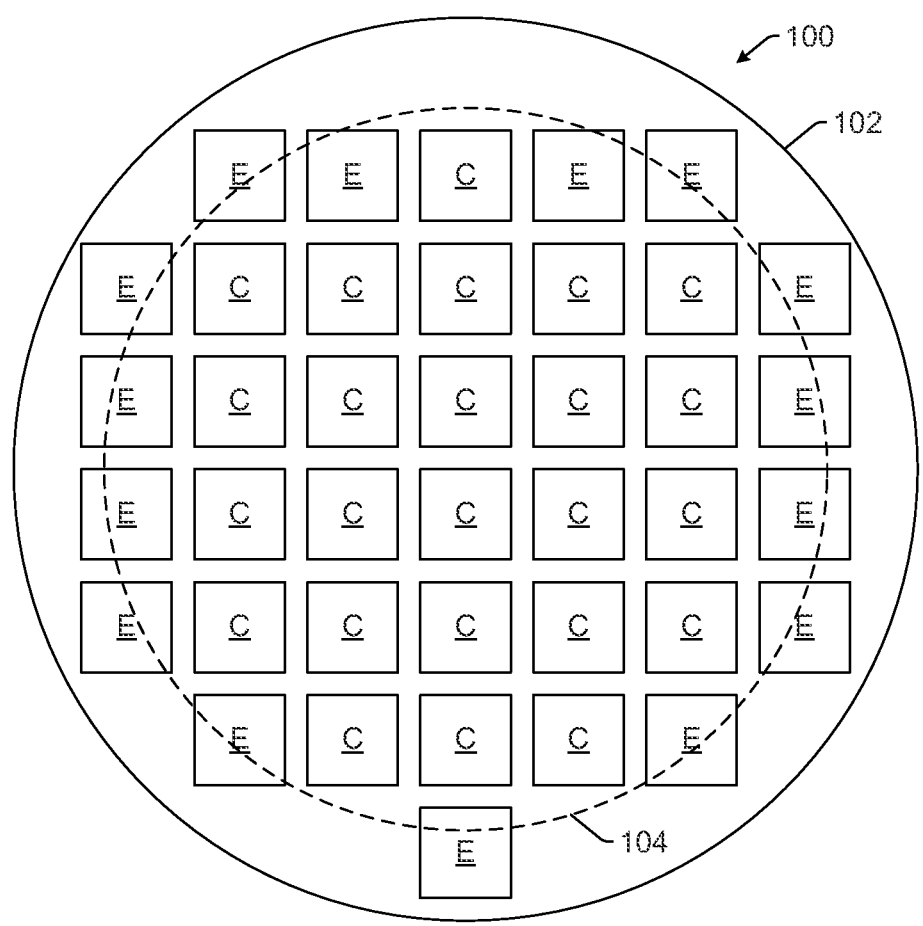
FIG. 1 is a schematic diagram illustrating a plan view of a wafer and different dies on the wafer that have different noise sources in output of an inspection system.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The embodiments described herein can be used for inspection recipe setup from reference image variation. One embodiment relates to a computer-implemented method for generating information for use in a wafer inspection process. As described further herein, the embodiments provide an empirical means of segmenting images acquired by an inspector based on expected image variation across a die, field, or wafer. The embodiments may also include combining other segmentation data sources with empirical noise data to provide a more robust and accurate solution.

The method includes acquiring output of an inspection system for one or more dies located on one or more wafers. For example, acquiring the output may include scanning light over the wafer(s) and generating output responsive to light from the wafer(s) detected by the inspection system during the scanning. In this manner, acquiring the output may include scanning the wafer(s). However, acquiring the output does not necessarily include scanning the wafer(s). For example, acquiring the output may include acquiring the output from a storage medium in which the output has been stored (e.g., by the inspection system). Acquiring the output from the storage medium may be performed in any suitable manner, and the storage medium from which the output is acquired may include any of the storage media described herein. The inspection system may be configured as described further herein. In addition, the one or more dies and the one or more wafers may include any of such dies and wafers described herein. Although the terms "output" and "images" may be used interchangeably herein, it is to be understood that the output used in the embodiments described herein may include any output that can be generated by a detector of a wafer inspection system for a wafer.

The method also includes combining the output for the one or more dies based on within die positions of the output. The embodiments described herein can build upon existing standard reference die (SRD) infrastructure to generate a composite noise reference that can serve as the basis for a context based inspection run time context map (CBI RTCM) calculation. For example, combining the output may be performed in the same manner as that performed to generate a standard reference image. The standard reference image may be generated as described in commonly assigned U.S. Pat. No. 8,204,296 to Bhaskar et al. issued on Jun. 19, 2012, which is incorporated by reference as if fully set forth herein. The embodiments described herein may include any step(s) of any method(s) described in this patent and may be further configured as described in this patent. The embodiments described herein may combine the output using the infrastructure described in this patent. The output used in the combining step may be several die images such as those used for standard reference image generation in the above-referenced patent.

Combining the output for the one or more dies may include aligning the output for the one or more dies to each other, preferably with sub-pixel accuracy, and processing the aligned output together to thereby generate a standard reference image from the aligned output. For example, when computing an average or median image, the output that is being averaged (or whose median value is being computed) may be aligned to sub-pixel accuracy. Aligning multiple output to within sub-pixel accuracy may be performed in any suitable manner including as described in U.S. Pat. No. 7,676,077 issued to Kulkarni et al. on Mar. 9, 2010, which is incorporated by reference as if fully set forth herein. The embodiments described herein may include any step(s) of any method(s) described in this patent and may be further configured as described in this patent. Aligning multiple output to within sub-pixel accuracy may also be performed using the NanoPoint product that is commercially available from KLA-Tencor, Milpitas, Calif. Determining an average or median image from the output for the one or more dies may be performed using any suitable method and/or algorithm.

The method includes determining, on a within die position basis, a statistical property of variation in values of one or more characteristics of the combined output. In other words, the statistical property may be determined for each within die position separately. In this manner, the statistical property may be determined as a function of within die position. The statistical property may include any of the statistical properties described herein. The variation in the values of the one or more characteristics is preferably responsive to the typical noise in the values of the one or more characteristics. The one or more characteristics may include any of the characteristics described herein such as grey level.

In one embodiment, the output for the one or more dies includes images, and the within die positions correspond to different pixels in the images. In this manner, the embodiments described herein may build on top of standard reference image infrastructure by determining and then exporting the pixel-by-pixel statistics of the individual die images that were combined to generate a reference image (e.g., a median reference image).

In some embodiments, the statistical property may be (or may be determined based on) a mean of the values of the one or more characteristics. The mean may be particularly useful for the embodiments described herein because different materials have different reflectivity as a function of illumination conditions. Noise characteristics of difference images are a strong function of variation in the physical properties of the material and variation in shape, thickness, volume, etc. of the material. In addition, given that geometries being inspected are typically well below the optical resolution of the inspector, the density and arrangement of geometries can drive variations in mean value of the source image. Thus, in the interest of using all available information, the mean grey level of the combined output may be useful input to the segmentation schemes described herein. However, although some embodiments are described herein with respect to a specific statistical property such as mean, median, range, or "expected value" of the pixels at a given location in the set of images being considered, the embodiments described herein are not dependent on a specific statistical measure or "centrality" or "expected value" of the data. In other words, the statistical property described herein may be any figure of merit for statistical variation within a set of pixels.

In one embodiment, the output for the one or more dies includes images, and the one or more characteristics include grey level. For example, the embodiments described herein may use grey level variation as a key determinant for generating care areas. In other words, grey level may be used herein to express the data associated with a specific location in an acquired image. However, the one or more characteristics may include any other characteristics of inspection system output that are responsive to non-defect related noise on a wafer. In addition, the values to be analyzed may be more complex than a single grey level value. The one or more characteristics may also include any characteristics of the output that will be used for defect detection (e.g., since noise in such characteristics is the noise that will be most relevant to performance of the inspection process).

Steps of the methods described herein may be performed at the die, reticle field, or wafer level. (Die and reticle field are interchangeable for single die reticles.) The choice of whether to construct standard reference noise images (data sets) from a set of die images or a set of reticle field images depends on both the layout of the reticle field (mask physical design data) and the manner in which the image acquisition is conducted. The key is to analyze pixels with the same design intent at the mask data level and pixels that were acquired on the exact same locations (e.g., to avoid pixilation errors). Imaging performed with the intent of comparing reticle field-to-reticle field can be different from imaging performed with the intent of die-to-die comparison. Therefore, even if the mask design intent is identical for multiple die on a reticle field, the data from these identical die within a reticle field should not be used together if pixilation was performed at the reticle level. The proposed methodology assumes practically perfect image-to-image overlay such that there is relatively high confidence that for a given point on a chip design, the associated pixel grey level values collected from the multiple die images indeed represent the same relative location within the die. To the extent that this is not true, there will be additional variation injected into the analysis. Image processing techniques such as interpolation may be used to correct raw image data for overlay error.

In one embodiment, determining the statistical property includes identifying outlying values of the one or more characteristics of the combined output, eliminating the outlying values from the combined output thereby generating altered combined output, and determining the statistical property based on the altered combined output. For example, determining the statistical property may include sorting every pixel by its grey level, throwing away the strongest outlier(s) (e.g., darkest and/or brightest pixels, which potentially correspond to a defect) and returning a range (a truncated range) as a measure of the noise for each pixel (or at least some of the pixels). In particular, the defect detection process for semiconductor wafers typically includes the notion of determining statistically different pixel grey level values from a sample population of pixels. Various schemes may be used to select the population of pixels for each outlier analysis (detection). The more accurately the normal variation of a point (pixel) within a reticle field or die can be determined, the more effective the segmentation of the image into like-pixel-locations, which leads to a more sensitive inspection. Therefore, the task of determining the normal range of grey level variation across a set of recorded images at a given point in a chip may include a filtering step that is intended to remove "defects" from the population. In this manner, pixels corresponding to defects are not used to determine the statistical property as described herein, which is used as described further herein to assign the pixels to groups, so that pixels are not placed into "noisier" groups than they should be. A relatively simple and conservative approach would be to "throw away" the "most different" pixel sample for each location. More sophisticated statistical approaches can be used such as eliminating pixels determined to be defective in an actual inspection performed prior to the steps of determining the statistical property and assigning the within die positions to different groups (segmentation) described herein.

In another embodiment, determining the statistical property includes determining, on the within die position basis, a median of the values of the one or more characteristics of the combined output, determining, on the within die position basis, differences between the values of the one or more characteristics of the output and the corresponding median of the values, combining the differences for the one or more dies based on the within die positions of the output, and determining, on the within die position basis, the statistical property of the variation based on the combined differences. For example, determining the statistical property may include calculating the delta or difference between the individual die images and the combined output (e.g., a median die pixel map) and determining the statistical property from the calculated delta or difference.

The resulting "noise map" representation (e.g., the statistical property as a function of within die position) may be thought of as a compliment to the combined output (e.g., the median reference image). For example, standard reference images have been used to provide a reference image for "test images" to be compared to for the identification of defects in the test images. In contrast, the embodiments described herein may make use of the difference values calculated in a test—reference operation (where the combined output is subtracted from the output at corresponding within die positions) to identify and then eliminate the output that corresponds to defects. In this manner, a standard reference image has been used previously for detecting defects for the sake of defect detection but the combined output described herein is used for detecting defects to eliminate those defects from further steps performed in the embodiments described herein. In this manner, the use of the combined output described herein is the compliment of the previous use of the standard reference images.

The method includes assigning the within die positions to different groups based on the statistical properties determined for the within die positions. In one embodiment, the different groups define different care areas for the wafer inspection process. For example, the process of creating a segment map with multiple "noise region" care area groups can be performed by partitioning a histogram of noise statistic values at each pixel in the map into "bins" each representing a care area group. For practical implementation reasons (e.g., a limit in the size or number of individual care areas), smoothing and/or "annealing" operations may be performed. The resulting segment map may be converted to vector space for further processing. In this manner, the embodiments described herein may combine empirical image variation data at the full die, reticle field, or wafer level with image segmentation for wafer inspection.

The embodiments described herein have, therefore, a number of advantages over other currently used methods and systems for setting up a wafer inspection process for image segmentation. For example, the embodiments described herein provide an analytical approach to grouping and parsing care area groups based on prior knowledge of the likely noise behavior of a wafer on an inspector. In contrast, setting up care area groups based on likely noise behavior of a wafer on an inspector may be performed manually today or it may be skipped altogether due to the relatively complex nature of the problem and lack of practical data to guide decisions.

In one embodiment, the assigning is performed such that the within die positions having values of the statistical properties within a first range are assigned to one of the different groups and the within die positions having the values of the statistical properties within a second range are assigned to another of the different groups, and the first and second ranges are different. In other words, the different groups correspond to different ranges of the values of the statistical properties. In addition, the different ranges of the values of the statistical properties may be mutually exclusive such that any one pixel will be assigned to only one group based on its value of the statistical property. The different ranges may be determined as described further herein (e.g., partitioning a histogram). In this manner, the within die positions assigned to any one group may have statistically similar values of the statistical property and values of the statistical property that are statistically different than the within die positions assigned to any other group. As such, the different groups separate the within die positions into like-noise groups that can be used for like-noise segmentation in a wafer inspection process.

In some embodiments, the within die positions assigned to one of the different groups include the within die positions of device features having different criticalities from each other. In another embodiment, the assigning is not performed based on design information for the within die positions. In other words, assigning the within die positions to the different groups is not performed based on design information for the wafer. Instead, the assigning step may only be based on empirical noise information as described herein. Therefore, the assigning step may be performed without regard to the design information for the within die positions, which may result in any one group including within die positions that have different criticalities or other design characteristics in the design. As such, the groups described herein are not equivalent to groups that are generated by separating within die positions based on design information for the within die positions.

The method includes storing information for the within die positions and the different groups to which the within die positions are assigned in a storage medium that is accessible to the inspection system for performing the wafer inspection process. Storing the information may include storing the information, possibly in combination with other results of one or more steps of the method embodiments, in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. The information may be stored in any suitable data structure (e.g., a library or database) that can be used by an inspection system for performing a wafer inspection process.

In another embodiment, the acquiring, combining, determining, assigning, and storing steps are performed before the wafer inspection process is performed. In this manner, the embodiments described herein provide noise-based segmentation that is supervised because the segmentation is known before inspection. In contrast, "unsupervised" segmentation is typically conducted at run time. "Unsupervised" operations can include mean and range values from multiple images collected at run time. CBI is a "supervised" image segmentation approach in that prior knowledge of the expected image is applied during inspection run time. CBI previously may have only applied design-related "prior knowledge." However, in the embodiments described herein, CBI can be extended to explicitly consider systematic image-related "prior knowledge" into the segmentation scheme.

The wafer inspection process includes applying one or more defect detection parameters to additional output of the inspection system generated for a wafer based on the information to thereby detect defects on the wafer. For example, the within wafer positions of the additional output may be used to assign the additional output to different groups and therefore the different care areas corresponding to the groups. In one such example, the wafer inspection process may include comparing the within die positions of the additional output to the within die positions assigned to the different groups. In this manner, the additional output can be assigned to the different groups thereby segmenting the additional output into the care areas corresponding to the different groups.

The one or more defect detection parameters may then be applied to the additional output based on the different groups to which it has been assigned. For example, different defect detection parameters may be determined for the different groups. Therefore, once the additional output has been assigned to the different groups, different defect detection parameters may be applied to the additional output in the different groups. The defect detection parameters determined for the different groups may be different in any manner (e.g., different algorithms, different parameters of the same algorithm, etc.) and may be determined in any suitable manner.

The segmentation derived from the methodology described herein is generally applicable to any defect detection method and/or algorithm. In other words, the wafer inspection process performed using the information generated and stored as described herein is not limited in the defect detection that can be performed in that wafer inspection process. In some instances, the combined output generated as described herein, which may essentially be a standard reference image, may be used for defect detection. However, the defect detection may be performed by using the segmented additional output with any suitable defect detection algorithm and/or method known in the art.

The wafer inspection process performed using the information that is generated and stored as described herein may be used for only one wafer (e.g., the wafer that was used to setup the wafer inspection process) or more than one wafer. For instance, as long as a process used to fabricate the wafers does not change dramatically, then the same information can be used for inspection of multiple wafers fabricated in the process. In other words, if the process used to fabricate the wafers changes dramatically, those changes could cause significant changes to the image noise variation on the wafer. Therefore, the information generated as described herein based on the image noise variation will not necessarily be suitable for use in inspecting wafers created with the changed process. In some instances, the information generated as described herein could be used for inspection of multiple wafers until a substantially abnormal inspection result (e.g., massive nuisance detection) is obtained since that substantially abnormal inspection result may indicate a dramatic fabrication process change that requires an update to the information used in the wafer inspection process.

In general, a given wafer (or portion thereof) can be analyzed in multiple ways for the purpose of determining statistically different pixels. For a given set of images collected at the same optical condition and the same pixilation scheme, one would expect to have a single wafer level segmentation map with unambiguous classification of each pixel that is used subsequently to group pixels of the same classification. The images may be explicitly collected with this intent. However, in some embodiments, the combining, determining, assigning, and storing steps are performed as described herein for only some dies on the wafer(s), and the stored information is not used for wafer inspection of other dies on the wafer(s). For example, the information may be generated according to any of the embodiments described herein on a die-to-die basis. In this manner, different information may be used for wafer inspection of different dies on the wafer. In other words, the embodiments described herein can be extended to multiple context maps per inspection such that multiple noise behaviors can be accommodated by a single inspection.

In one embodiment, the combining, determining, assigning, and storing steps are separately performed for different sets of the one or more dies on the one or more wafers thereby generating different information for the different sets of the one or more dies. Each of the different sets may include at least one die. In other words, some of the different sets may include only one die. As described further herein, the dies may be separated into the different groups based on the across wafer noise within the different dies. In this manner, different dies that have the same or substantially similar across wafer noise sources therein may be separated into the same set. As such, all of the dies in any one of the different sets may have the same or substantially the same across wafer noise sources therein. The different information for the different sets may be stored as described further herein and may be used during the wafer inspection process as described further herein.

In one such embodiment, the different sets of the one or more dies have different noise sources in the output. In another such embodiment, one of the different sets does not include any of the one or more dies located adjacent to an edge of the one or more wafers, and another of the different sets includes at least one of the one or more dies located adjacent to the edge of the one or more wafers. For example, edge dies may have different noise sources than non-edge dies and thus may need different segmentation. In this manner, different combining, determining, and assigning steps may be performed to determine the segmentation schemes for parts of the wafer that display unique image variation (e.g., edge die).

FIG. 1 illustrates one example of a wafer that has a noise source that varies across the wafer. For example, wafer 100 shown in FIG. 1 has edge 102 that defines the outer periphery of the wafer. Some processes performed on wafers have across wafer variations that cause different levels of noise at the edge of the wafer compared to the center of the wafer. For example, some processes may cause a greater level of noise in an area of the wafer adjacent to the wafer edge, which is shown in the example of FIG. 1 as the area between edge 102 and line 104. Line 104 is not actually part of wafer 100, but is shown in FIG. 1 to illustrate an example of how different parts of the wafer can exhibit different noise levels. In this manner, the portions of wafer 100 within line 104 may have one level of noise and the portions of wafer 100 between line 104 and edge 102 may have a different level of noise. As such, any dies on wafer 100 that are wholly within line 104 may have one level of noise and any dies that are at least partially located in the area between line 104 and edge 102 may have a different level of noise. In this manner, the dies that are wholly located within line 104 may be referred to as center dies, or dies C shown in FIG. 1, and dies that are at least partially located between line 104 and edge 102 may be referred to as edge dies, or dies E shown in FIG. 1.

Since all of the center dies on this example wafer may have the same or substantially the same noise sources, the method described herein may be performed for a set of the dies that includes all of dies C. In other words, the output generated for all of dies C may be processed collectively in the method described herein. However, as further shown in FIG. 1, none of the edge dies on this example wafer have the same or substantially the same across wafer noise therein. In other words, no two edge dies on this wafer have the same across wafer noise sources at all of the within die positions. This is illustrated by the way that line 104 intersects each of the edge dies E shown in FIG. 1 differently, thereby dividing the edge dies into one portion located in one area of the wafer having one noise source and another portion located in another area of the wafer having a different noise source. In this manner, in each of the edge dies shown in FIG. 1, the across wafer noise affects all of the within die positions in any one die differently from all of the other edge dies.

The method described herein may, therefore, be performed for each edge die separately. As such, some of the different sets of dies may include only one edge die, and the information described herein may be generated and stored separately for each edge die such that the information substantially accurately represents all of the within die noise sources (including the across wafer noise sources) and can therefore be used to substantially accurately segment the die output into different groups or care areas based on noise. The embodiments described herein can therefore generate information that can be used in a wafer inspection process for highly sensitive wafer inspection regardless of die position on a wafer.

As described above, therefore, some of the edge dies may have within die image variation that is unlike the image variation in any of the other edge dies. For instance, each of the edge dies may have different within die image variation than each of the other edge dies based on the within wafer positions of the edge dies (since the whole wafer noise variation may affect different dies differently based on their within wafer position). Therefore, on any given wafer, there may be a single die having image variation unlike any other die on the wafer. As such, there may not be multiple dies on the wafer that can be used for the combining step described herein. Consequently, in order to have output from multiple dies that can be combined together as described herein for any one edge die, the output corresponding to that edge die may be generated using more than one wafer (i.e., the edge dies at the same within wafer position on more than one wafer). Prior to combining such output, the output generated from multiple wafers should be aligned to each other as described further herein to ensure that the output for different wafers is aligned to within sub-pixel accuracy. Such wafer-to-wafer alignment of inspection system output may be performed as described in the above-referenced patent to Kulkarni et al.

In an additional such embodiment, the different sets of the one or more dies have mutually exclusive within wafer positions. For example, the different sets of the one or more dies may correspond to different portions of the wafer that do not overlap on the wafer. In one such example, a die that is included in one of the different sets may not be included in another of the different sets. The membership of the dies in the different sets may be mutually exclusive since the different sets may correspond to different across-wafer noise variation within the dies. Therefore, since a die may only be impacted by the across-wafer noise variation in one way, it can only belong to one of the different sets. As such, the one or more dies may be separated into the different sets based on a priori knowledge of the across-wafer noise and/or process variation.

In this manner, the embodiments described herein may include generating different information (and therefore different segmentation) for different parts of the wafer. In one such example, all of the non-edge dies may have the same segmentation, while each of the edge dies may have different segmentation from each of the other dies on the wafer. The segmentation described herein can, therefore, be both within die position dependent as well as within wafer position dependent. In that case, during a wafer inspection process, the within wafer position of a die being inspected can be used to determine which segmentation scheme should be applied to the output generated for that die. The within die positions of the output may then be segmented using the determined segmentation scheme. As such, the information described herein may effectively define a whole wafer segmentation scheme that maps pixels to segments based on both within die position and within wafer positions of the dies. Therefore, if different information is determined for the wafer, the different information, in combination, may form a kind of whole wafer segmentation map, in which the segmentation for any one die is based on the expected noise behavior in that die. In this manner, the embodiments described herein provide a flexible, high sensitivity inspection scheme that can accommodate multiple noise floor scenarios within a single inspection.

As described above, the method may be separately performed for different portions of the wafer corresponding to different dies on the wafer that have different noise sources due to their positions on the wafer. Therefore, the wafer may be split up into different dies having different noise sources. The wafer may, however, be split up into other different portions. For example, the within wafer positions may be split up without regard to within die positions, and then the different groups of within wafer positions may be processed separately by the method.

In one such example, the within wafer positions may be split up into different groups. Each of the different groups may include a contiguous set of within wafer positions. A periphery surrounding each of the contiguous sets of within wafer positions may define an area for each of the sets, and the areas within each of the peripheries do not overlap the areas of any of the other peripheries. The characteristics (e.g., size, shape, dimensions) of the areas defined by the different sets may correspond to characteristics of relatively large scale (e.g., larger than a die or reticle field on the wafer) across wafer noise sources. In one such example, for the wafer shown in FIG. 1, the within wafer positions within line 104 may be included in one set of within wafer positions and the within wafer positions between edge 102 and line 104 may be included in a different set of within wafer positions. Therefore, the within die positions of a single die may be included in different sets and may be processed in different versions of the method.

The segmentation described herein would then be setup on the within die position basis, for a subset of the wafer positions. As a result, during inspection, the within wafer position of output may be used to determine which segmentation scheme is to be used for the output and then the within die position of the output may be used to actually segment the output based on the determined segmentation scheme.

In another embodiment, the acquiring, combining, determining, assigning, and storing steps are separately performed for different optical modes of the inspection system thereby generating different information for the different optical modes. For example, since different optical modes of an inspection system will generate output having different characteristics and since the method is performed based on one or more characteristics of output generated by an inspection system, the information for the different groups generated by the embodiments described herein may not be used for more than one optical mode (i.e., only the optical mode that was used to generate the output). In this manner, for each optical mode used for a wafer inspection process and whose output is to be segmented, the method may be separately performed.

In some embodiments, the method includes combining the information with other information for the within die positions and additional groups to which the within die positions are assigned based on design information for the wafer, and the wafer inspection process includes applying the one or more defect detection parameters to the additional output based on the combined information to thereby detect the defects on the wafer. In this manner, the embodiments described herein can be used in concert with other segmentation schemes such as design-based schemes. For example, the segment map resulting from the assigning step described above may be converted to vector space for further processing with design-related care area data.

In addition, hot spot care areas for a new product design may be provided to a wafer fab by a design for manufacturing (DFM) team based on the output from a process modeling tool. The contents of that file may be made with the intent of image segmentation for inspection signal-to-noise optimization. Boolean operations of this DFM-based file with care areas from empirical noise analysis can be performed to partition the DFM file into like-noise care area sets. In particular, the empirical data described herein may be used for combining design-based care areas with similar noise behavior or to divide design-based care areas into multiple care areas.

The design information may also include context information generated in any one or more other ways. For example, the design information may be generated by an electronic design automation (EDA) reference flow in which EDA design extraction scripts are run on upstream design data (e.g., a GDS file). The design information may also be generated from design in yield engineering in which design data in a fab is input to feature extraction (e.g., rule-based feature extraction and/or polygonal template-based feature extraction) and morphological analysis. In addition, design information may be generated from a standard reference image using template-based image segmentation. Furthermore, design information may be generated from hot spot data by using design analysis software or design rule checking (DRC) tools to generate a hot spot/care area design data file. The design information and corresponding context map may be generated as described in U.S. Pat. No. 7,877,722 to Duffy et al. issued on Jan. 25, 2011, which is incorporated by reference as if fully set forth herein. The embodiments described herein may include any step(s) of any method(s) described in this patent and may be further configured as described in this patent. In addition, combining the information with the design information as described herein may be further performed as described in this patent.

In this manner, the information for the different groups determined as described herein may be used to group and/or segment design-based care areas in the spirit of CBI. Furthermore, these new care area groups can be combined with care area groups from other sources on the basis of the noise map. In this manner, the empirical data generated by the methods described herein can be combined with CBI care areas. Therefore, the embodiments described herein integrate a unique combination of capabilities that can be used to make the CBI concept more powerful.

In another embodiment, the wafer inspection process includes applying the one or more defect detection parameters to the additional output based on the information and design information for the within die positions to thereby detect the defects on the wafer. For example, the wafer inspection process may be performed based on both empirically generated noise-based care areas and design-based care areas without actually combining the two types of care areas. In one such example, the wafer inspection process may include looking up a noise-based care area and a design-based care area for a pixel based on the within die position of that pixel and then applying defect detection parameter(s) to the pixel based on both types of care areas. The appropriate defect detection parameter(s) for any combination of noise-based care area and design-based care area may be determined in a number of different ways (e.g., based on rules determined prior to the wafer inspection process).

The acquiring, combining, determining, assigning, and storing steps described herein are performed by a computer system, which may be configured according to any of the embodiments described herein. In one embodiment, the computer system is configured as a virtual inspector. For example, some manifestation of a virtual inspector (VI) may be an element of implementation for the embodiments described herein. A computer system may be configured as a VI as described in U.S. Pat. No. 816,255 to Bhaskar et al. issued on Feb. 28, 2012, which is incorporated by reference as if fully set forth herein. The embodiments described herein may be further configured as described in this patent. Configuring the computer system as a VI is advantageous for the embodiments described herein since the embodiments include steps that include using stored images that are post-processed (i.e., instead of being processed as they are acquired). Therefore, the embodiments described herein may require significant storage capacity and data handling, which can be provided by a VI. However, the computer system may be configured as any other computer system or subsystem described herein.

The embodiments described herein may be configured for multi-source CBI visualization. For example, the embodiments described herein provide practical solutions to realize the benefits of combined design and image based segmentation to feed CBI inspections. Part of making the methodology practical may be providing methods and utilities for human validation of what the algorithms are doing. In addition, the spatial signatures of the data generated in the course of using the described methodology are the result of systematic variation in the interaction between the chip layout and the processing performed to build the chips. A potential byproduct of this analysis is the revelation of unexpected signatures that for practical reasons can only be recognized by a human. In other words, there may be a "signal" or signature in the "noise" that can be recognized by a user. As such, displaying results of one or more of the steps described herein, such as the statistical property determined on a within die position basis, on a user interface (UI) such as that described further herein may be performed for validation purposes as well as possibly for identifying unique signatures on the wafer that may be related to design-process interactions on the wafer. The visualization described herein may be further performed as described in U.S. Pat. No. 8,611,639 to Kulkarni et al. issued on Dec. 17, 2013, which is incorporated by reference as if fully set forth herein. The embodiments described herein may include any step(s) of any method(s) described in this patent.

Another embodiment relates to a computer-implemented method for detecting defects on a wafer. This embodiment includes the steps of acquiring the output, combining the output, determining the statistical property, and assigning the within die positions to different groups of the method described above. This embodiment also includes assigning one or more defect detection parameters to the different groups based on the statistical properties for the within die positions assigned to the different groups, which may be performed according to any of the embodiments described herein. In addition, the method includes acquiring additional output for a wafer with the inspection system. Acquiring the additional output may be performed as described further herein and the inspection system may be configured as described herein. The method further includes assigning the additional output to the different groups by comparing the within die positions of the additional output with the within die positions assigned to the different groups, which may be performed according to any of the embodiments described herein. The method also includes detecting defects on the wafer by applying the one or more defect detection parameters to the additional output based on the different groups to which the additional output has been assigned, which may be performed according to any of the embodiments described herein. The steps of this method are performed by a computer system, which may be configured according to any of the embodiments described herein.

Each of the embodiments of the methods described above may include any other step(s) of any other method(s) described herein. Furthermore, each of the embodiments of the methods described above may be performed by any of the systems described herein.

Figure 2:
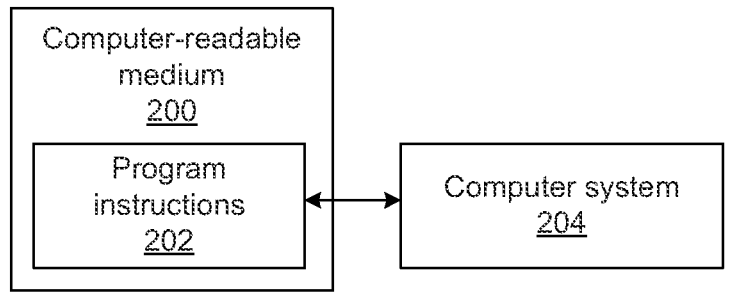
FIG. 2 is a block diagram illustrating one embodiment of a non-transitory computer-readable medium storing program instructions for causing a computer system to perform a computer-implemented method described herein.

Another embodiment relates to a non-transitory computer-readable medium storing program instructions executable on a computer system for performing a computer-implemented method for generating information for use in a wafer inspection process. One such embodiment is shown in FIG. 2. For example, as shown in FIG. 2, non-transitory computer-readable medium 200 stores program instructions 202 executable on computer system 204 for performing a computer-implemented method for generating information for use in a wafer inspection process. The computer-implemented method may include any step(s) of any method(s) described herein.

Program instructions 202 implementing methods such as those described herein may be stored on non-transitory computer-readable medium 200. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Computer system 204 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 3:
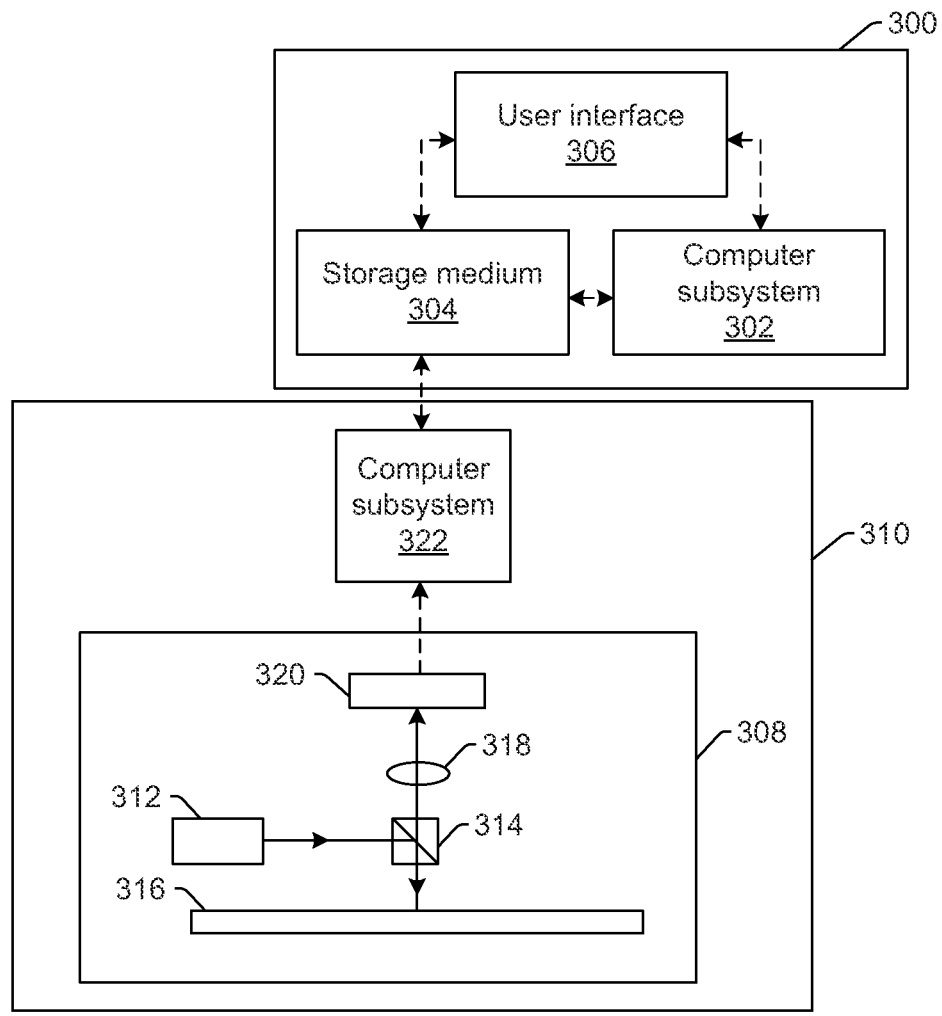
FIG. 3 is a schematic diagram illustrating a side view of an embodiment of a system configured to generate information for use in a wafer inspection process.

An additional embodiment relates to a system configured to generate information for use in a wafer inspection process. One embodiment of such a system is shown in FIG. 3. As shown in FIG. 3, system 300 includes computer subsystem 302. The computer subsystem is configured for performing the acquiring the output, combining the output, determining the statistical property, and assigning the within die positions steps of the methods described herein. The computer subsystem may be configured for performing any other step(s) of any method(s) described herein. The computer subsystem may be further configured according to the computer system embodiments described herein.

In one embodiment, the computer subsystem is configured as a virtual inspector. For example, as shown in FIG. 3, system 300 does not necessarily include an optical, electron beam, or other inspection subsystem such as that described further herein although the system may be configured to perform wafer inspection-like functions using output of an inspection system that has been stored in a storage medium of the computer subsystem or that is accessible to the computer subsystem. In an additional example, system 300 does not necessarily include any physical wafer handling capability. In this manner, a wafer may not be positioned in the system and the system may not therefore generate output for a wafer by scanning a wafer. Therefore, system 300 is not necessarily configured as an actual inspection system. The computer subsystem of system 300 may be further configured as a VI as described herein.

As further shown in FIG. 3, system 300 also includes storage medium 304 that is coupled to computer subsystem 302 and configured for performing the storing step of the method embodiments described herein. Storage medium 304 may be further configured as any of the non-transitory computer-readable storage media described herein. The storage medium may be coupled to the computer subsystem in any suitable manner such that the computer subsystem can send information to be stored to the storage medium and can receive information from the storage medium.

As also shown in FIG. 3, system 300 may include user interface 306, which may be configured as any suitable user interface. The user interface may be configured to perform any step(s) of any method(s) described herein such as displaying results of one or more steps of one or more methods to a user (e.g., for visualization purposes and/or validation purposes). Therefore, the user interface may be coupled to computer subsystem 302 and storage medium 304 such that information generated by the computer subsystem and stored by the storage medium can be displayed in the user interface for a user.

The storage medium is accessible to inspection system 310 for performing the wafer inspection process. The wafer inspection process may include any of the wafer inspection processes described herein. In the embodiment shown in FIG. 3, storage medium 304 is accessible to computer subsystem 322 of inspection system 310 for performing the wafer inspection process. For example, the storage medium may be coupled to computer subsystem 322 in any suitable manner such that computer subsystem 322 can access the information stored in the storage medium. In this manner, the computer subsystem of the inspection system can access the information that is generated and stored as described herein and then use that information to perform wafer inspection on a wafer.

The inspection system includes inspection subsystem 308 configured to generate output for a wafer by scanning light over the wafer and detecting light from the wafer during the scanning. As shown in FIG. 3, the inspection subsystem includes light source 312, which may include any suitable light source known in the art such as a broad band plasma (BBP) light source. Light from the light source may be directed to beam splitter 314, which may be configured to direct the light from the light source to wafer 316. The light source may be coupled to any other suitable elements (not shown) such as one or more condensing lenses, collimating lenses, relay lenses, objective lenses, apertures, spectral filters, polarizing components and the like. As shown in FIG. 3, the light may be directed to the wafer at a normal angle of incidence. However, the light may be directed to the wafer at any suitable angle of incidence including near normal and oblique incidence. In addition, the light or multiple light beams may be directed to the wafer at more than one angle of incidence sequentially or simultaneously. The inspection subsystem may be configured to scan the light over the wafer in any suitable manner.

Light from wafer 316 may be collected and detected by one or more detectors of the inspection subsystem during scanning. For example, light reflected from wafer 316 at angles relatively close to normal (i.e., specularly reflected light when the incidence is normal) may pass through beam splitter 314 to lens 318. Lens 318 may include a refractive optical element as shown in FIG. 3. In addition, lens 318 may include one or more refractive optical elements and/or one or more reflective optical elements. Light collected by lens 318 may be focused to detector 320. Detector 320 may include any suitable detector known in the art such as a charge coupled device (CCD) or another type of imaging detector. Detector 320 is configured to generate output that is responsive to the reflected light collected by lens 318. Therefore, lens 318 and detector 320 form one channel of the inspection subsystem. This channel of the inspection subsystem may include any other suitable optical components (not shown) known in the art. The output of the detector may include, for example, images, image data, signals, image signals, or any other output that can be generated by a detector suitable for use in an inspection system.

Since the inspection subsystem shown in FIG. 3 is configured to detect light specularly reflected from the wafer, the inspection subsystem is configured as a bright field (BF) inspection system. Such an inspection subsystem may, however, also be configured for other types of wafer inspection. For example, the inspection subsystem shown in FIG. 3 may also include one or more other channels (not shown). The other channel(s) may include any of the optical components described herein such as a lens and a detector, configured as a scattered light channel. The lens and the detector may be further configured as described herein. In this manner, the inspection subsystem may also be configured for dark field (DF) inspection.

The inspection system also includes computer subsystem 322 that is coupled to the inspection subsystem. For example, the computer subsystem may be coupled to one or more detectors of the inspection subsystem such that the computer subsystem can receive output generated by the detector(s). In this manner, output generated by the detector(s) of the inspection subsystem may be provided to computer subsystem 322. Computer subsystem 322 is configured for detecting defects on a wafer based on the output generated for the wafer by the inspection subsystem, which may be performed according to any of the embodiments described herein. Computer subsystem 322 may be configured to perform any other steps described herein.

It is noted that FIG. 3 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection subsystem (e.g., by adding functionality described herein to an existing inspection system) such as the 29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Furthermore, although the inspection system is described herein as being an optical or light-based inspection system, the inspection subsystem may be configured as an electron beam based inspection subsystem. The electron beam based inspection subsystem may be any suitable electron beam based inspection subsystem included in any suitable commercially available electron beam inspection system.

Further modifications and alternative embodiments of various aspects of the invention will be apparent to those skilled in the art in view of this description. For example, systems and methods for generating information for use in a wafer inspection process are provided. Accordingly, this description is to be construed as illustrative only and for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for generating information for use in a wafer inspection process, comprising:
acquiring output of an inspection system for one or more dies located on one or more wafers;
combining the output for the one or more dies based on within die positions of the output;
determining, on a within die position basis, a statistical property of variation in values of one or more characteristics of the combined output;
assigning the within die positions to different groups based on the statistical properties determined for the within die positions; and
storing information for the within die positions and the different groups to which the within die positions are assigned in a storage medium that is accessed by the inspection system for performing the wafer inspection process, wherein the wafer inspection process comprises applying one or more defect detection parameters to additional output of the inspection system generated for a wafer based on the information to thereby detect defects on the wafer, and wherein said acquiring, said combining, said determining, said assigning, and said storing are performed by a computer system.

2. The method of claim 1, wherein the different groups define different care areas for the wafer inspection process.

3. The method of claim 1, wherein said assigning is performed such that the within die positions having values of the statistical properties within a first range are assigned to one of the different groups and the within die positions having the values of the statistical properties within a second range are assigned to another of the different groups, and wherein the first and second ranges are different.

4. The method of claim 1, wherein the within die positions assigned to one of the different groups comprise the within die positions of device features having different criticalities from each other.

5. The method of claim 1, wherein said assigning is not performed based on design information for the within die positions.

6. The method of claim 1, wherein the output for the one or more dies comprises images, and wherein the one or more characteristics comprise grey level.

7. The method of claim 1, wherein the output for the one or more dies comprises images, and wherein the within die positions correspond to different pixels in the images.

8. The method of claim 1, wherein determining the statistical property comprises identifying outlying values of the one or more characteristics of the combined output, eliminating the outlying values from the combined output thereby generating altered combined output, and determining the statistical property based on the altered combined output.

9. The method of claim 1, wherein determining the statistical property comprises determining, on the within die position basis, a median of the values of the one or more characteristics of the combined output, determining, on the within die position basis, differences between the values of the one or more characteristics of the output and the corresponding median of the values, combining the differences for the one or more dies based on the within die positions of the output, and determining, on the within die position basis, the statistical property of the variation based on the combined differences.

10. The method of claim 1, wherein the combining, determining, assigning, and storing steps are separately performed for different sets of the one or more dies on the one or more wafers thereby generating different information for the different sets of the one or more dies.

11. The method of claim 10, wherein the different sets of the one or more dies have different noise sources in the output.

12. The method of claim 10, wherein one of the different sets does not comprise any of the one or more dies located adjacent to an edge of the one or more wafers, and wherein another of the different sets comprises at least one of the one or more dies located adjacent to the edge of the one or more wafers.

13. The method of claim 10, wherein the different sets of the one or more dies have mutually exclusive within wafer positions.

14. The method of claim 1, wherein the acquiring, combining, determining, assigning, and storing steps are separately performed for different optical modes of the inspection system thereby generating different information for the different optical modes.

15. The method of claim 1, further comprising combining the information with other information for the within die positions and additional groups to which the within die positions are assigned based on design information for the wafer, wherein the wafer inspection process further comprises applying the one or more defect detection parameters to the additional output based on the combined information to thereby detect the defects on the wafer.

16. The method of claim 1, wherein the wafer inspection process further comprises applying the one or more defect detection parameters to the additional output based on the information and design information for the within die positions to thereby detect the defects on the wafer.

17. The method of claim 1, wherein the computer system is configured as a virtual inspector.

18. The method of claim 1, wherein the acquiring, combining, determining, assigning, and storing steps are performed before the wafer inspection process is performed.

19. A computer-implemented method for detecting defects on a wafer, comprising:
acquiring output of an inspection system for one or more dies located on one or more wafers;
combining the output for the one or more dies based on within die positions of the output;
determining, on a within die position basis, a statistical property of variation in values of one or more characteristics of the combined output;
assigning the within die positions to different groups based on the statistical properties determined for the within die positions;
assigning one or more defect detection parameters to the different groups based on the statistical properties for the within die positions assigned to the different groups;
acquiring additional output for a wafer with the inspection system;
assigning the additional output to the different groups by comparing the within die positions of the additional output with the within die positions assigned to the different groups; and
detecting defects on the wafer by applying the one or more defect detection parameters to the additional output based on the different groups to which the additional output has been assigned, wherein said acquiring the output, said combining, said determining, said assigning the within die positions, said assigning the one or more defect detection parameters, said acquiring the additional output, said assigning the additional output, and said detecting are performed by a computer system.

20. A non-transitory computer-readable medium, storing program instructions executable on a computer system for performing a computer-implemented method for generating information for use in a wafer inspection process, wherein the computer-implemented method comprises:
acquiring output of an inspection system for one or more dies located on one or more wafers;
combining the output for the one or more dies based on within die positions of the output;
determining, on a within die position basis, a statistical property of variation in values of one or more characteristics of the combined output;
assigning the within die positions to different groups based on the statistical properties determined for the within die positions; and
storing information for the within die positions and the different groups to which the within die positions are assigned in a storage medium that is accessed by the inspection system for performing the wafer inspection process, wherein the wafer inspection process comprises applying one or more defect detection parameters to additional output of the inspection system generated for a wafer based on the information to thereby detect defects on the wafer.

21. A system configured to generate information for use in a wafer inspection process, comprising:
a computer subsystem configured for:
acquiring output of an inspection system for one or more dies located on one or more wafers;
combining the output for the one or more dies based on within die positions of the output;
determining, on a within die position basis, a statistical property of variation in values of one or more characteristics of the combined output; and
assigning the within die positions to different groups based on the statistical properties determined for the within die positions; and
a storage medium coupled to the computer subsystem and configured for storing information for the within die positions and the different groups to which the within die positions are assigned, wherein the storage medium is accessed by the inspection system for performing the wafer inspection process, and wherein the wafer inspection process comprises applying one or more defect detection parameters to additional output of the inspection system generated for a wafer based on the information to thereby detect defects on the wafer.

22. The system of claim 21, wherein the different groups define different care areas for the wafer inspection process.

23. The system of claim 21, wherein said assigning is performed such that the within die positions having values of the statistical properties within a first range are assigned to one of the different groups and the within die positions having the values of the statistical properties within a second range are assigned to another of the different groups, and wherein the first and second ranges are different.

24. The system of claim 21, wherein the within die positions assigned to one of the different groups comprise the within die positions of device features having different criticalities from each other.

25. The system of claim 21, wherein said assigning is not performed based on design information for the within die positions.

26. The system of claim 21, wherein the output for the one or more dies comprises images, and wherein the one or more characteristics comprise grey level.

27. The system of claim 21, wherein the output for the one or more dies comprises images, and wherein the within die positions correspond to different pixels in the images.

28. The system of claim 21, wherein determining the statistical property comprises identifying outlying values of the one or more characteristics of the combined output, eliminating the outlying values from the combined output thereby generating altered combined output, and determining the statistical property based on the altered combined output.

29. The system of claim 21, wherein determining the statistical property comprises determining, on the within die position basis, a median of the values of the one or more characteristics of the combined output, determining, on the within die position basis, differences between the values of the one or more characteristics of the output and the corresponding median of the values, combining the differences for the one or more dies based on the within die positions of the output, and determining, on the within die position basis, the statistical property of the variation based on the combined differences.

30. The system of claim 21, wherein the combining, determining, and assigning performed by the computer subsystem and the storing performed by the storage medium are separately performed for different sets of the one or more dies on the one or more wafers thereby generating different information for the different sets of the one or more dies.

31. The system of claim 30, wherein the different sets of the one or more dies have different noise sources in the output.

32. The system of claim 30, wherein one of the different sets does not comprise any of the one or more dies located adjacent to an edge of the one or more wafers, and wherein another of the different sets comprises at least one of the one or more dies located adjacent to the edge of the one or more wafers.

33. The system of claim 30, wherein the different sets of the one or more dies have mutually exclusive within wafer positions.

34. The system of claim 21, wherein the acquiring, combining, determining, and assigning performed by the computer subsystem and the storing performed by the storage medium are separately performed for different optical modes of the inspection system thereby generating different information for the different optical modes.

35. The system of claim 21, wherein the computer subsystem is further configured for combining the information with other information for the within die positions and additional groups to which the within die positions are assigned based on design information for the wafer, and wherein the wafer inspection process further comprises applying the one or more defect detection parameters to the additional output based on the combined information to thereby detect the defects on the wafer.

36. The system of claim 21, wherein the wafer inspection process further comprises applying the one or more defect detection parameters to the additional output based on the information and design information for the within die positions to thereby detect the defects on the wafer.

37. The system of claim 21, wherein the computer subsystem is configured as a virtual inspector.

38. The system of claim 21, wherein the acquiring, combining, determining, and assigning performed by the computer subsystem and the storing performed by the storage medium are performed before the wafer inspection process is performed.

* * * * *